United States Patent [19]
Bettan et al.

[11] Patent Number: 5,638,437
[45] Date of Patent: Jun. 10, 1997

[54] TELECOMMUNICATION SYSTEM AND METHOD ENABLING A USER TO GET ACCESS TO AN AUTOMATED CALL PROCESSING FROM A CENTRAL STATION OPERATING ON PULSE DIALLING MODE

[75] Inventors: Georges Bettan, St. Laurent; Joseph-Desire S. Kouam, Longueuil; Vatche Varvarian, Laval, all of Canada

[73] Assignee: Teleliason Inc., Quebec, Canada

[21] Appl. No.: 318,096

[22] Filed: Oct. 5, 1994

[51] Int. Cl.$^6$ .................................... H04M 1/26
[52] U.S. Cl. ................. 379/353; 379/257; 379/386; 379/286; 379/359
[58] Field of Search ........................... 379/353, 359, 379/362, 251, 257, 258, 286, 386

[56] References Cited

U.S. PATENT DOCUMENTS

| | | | |
|---|---|---|---|
| 3,959,598 | 5/1976 | Asmussen | 379/183 |
| 3,959,599 | 5/1976 | Masco et al. | 340/825.08 |
| 4,675,902 | 6/1987 | Boeckmann | 379/394 |
| 5,177,781 | 1/1993 | Fonton et al. | 379/339 |
| 5,228,079 | 7/1993 | Brav | 379/353 |

Primary Examiner—Jeffery Hofsass
Assistant Examiner—Jacques Saint-Surin
Attorney, Agent, or Firm—Sughrue, Mion, Zinn, Macpeak & Seas

[57] ABSTRACT

The present invention is related to a telecommunication system and method enabling a user to get access to any of automated call processing systems. The system comprises in combination a telephone line interface means adapted to provide function of a telephone set, a control means connected to the telephone line interface means, and adapted to constantly monitor the telephone line, analyze a call progress and a ring back tone signals and to switch automatically without human intervention from a pulse dialling mode to a DTMF dialling mode upon detection of a ring back signal validated by a central office. This system also includes a handset and keypad means connected to a telephone interface means and the control means. The central office processes calls in a pause dialling mode. The system enables the user to get access to automated call processing systems, the access to which is limited only to callers equipped with a DTMF telephones and central office base DTMF services. The telephone interface means are adapted to detect the presence of a ring signal on the telephone line, wherein the ring signal is indicating a receiving call mode. The control means are adapted to detect the presence of a ring back signal, wherein the ring back signal is indicating a placing call mode.

28 Claims, 6 Drawing Sheets

TELECOMMUNICATION SYSTEM AND METHOD ENABLING A USER TO GET ACCESS TO AN AUTOMATED CALL PROCESSING FROM A CENTRAL STATION OPERATING ON PULSE DIALLING MODE

The present invention is related to a telecommunication systems and more particularly to systems enabling to automated call processing systems, such as voice mail tele banking, voice response etc., via central offices operating on pulse dialling signals.

There is known U.S. Pat. No. 4,675,902 related to a high performance telephone instrument with combination pulse and tone dialling capacity. The circuitry permits the placement of a call through a rotary dial only system into a second network that is of a tone only nature.

There is also known U.S. Pat. No. 5,228,079 related to a method and apparatus for pulse/tone detection and selection comprising pulse and tone generators connected to a telephone network, selecting device and a controller in communication with said selector for causing said selector to select one of said generators.

There is also known U.S. Pat. No. 3,959,599 related to a call initiation delay arrangement for digital data switching system comprising means responsive to call initiating signals from each calling line for requesting the services of the common control equipment.

At the present time, the convenience that call processing technology (audiotex programs, voice mail and voice response, etc.) has provided people is indispensable. However those systems can be addressed only with DTMF signalling, creating a barrier for the pulse telephone user to experience the benefits of the technology.

The source of this barrier lies in the central office (COs), since some COs can process calls in pulse dialling mode only. Calls which are placed with DTMF signalling will not go through and therefore will inhibit the user to access the voice mail application.

The present invention solves this problem and presents a telephone set equipped with special circuitry capable of switching between pulse and DTMF or tone dialling modes automatically.

SUMMARY OF THE INVENTION

Broadly, the present invention comprises a telecommunication system enabling a user to get access to any of automated call processing systems, said system comprising in combination:

a telephone line interface means adapted to provide function of a telephone set;

a control means connected to said telephone line interface means and adapted to constantly monitor the telephone line, analyze a call progress and a ring back tone signals and to switch automatically without human intervention from a pulse dialling mode to a DTMF dialling mode upon detecting validated by a central office said ring back signal; and a handset and keypad means connected to said telephone interface means and said control means;

wherein said central office processes calls in a pulse dialling mode, and wherein said system enable the user to get access to said automated call processing systems which access is strictly limited only to callers equipped with a DTMF telephone and a central office base DTMF services.

Said telephone interface means are adapted to detect the presence of a ring signal on said telephone line, wherein said ring signal is indicating a receiving call mode, and said control means are adapted to detect the presence of a ring back signal, wherein said dug back signal is indicating a placing call mode.

In another embodiment, said control means comprises:

a microcontroller means and a differential amplifier means.

Said telephone line interface means comprises:

a microprocessor and a pulse dialling means.

In yet another embodiment, said microprocessor means further comprises a DTMF generator means adapted to provide the DTMF dialling mode, and said differential amplifier means is connected to the telephone line and is adapted to detect the presence of the ring back signal. Said microcontroller means is adapted to monitor and analyze presence of the ring signal detected by said telephone interface means, and said microcontroller means are adapted to monitor and analyze an output of said differential amplifier means.

Still in another embodiment, said microcontroller means when placing a call in a default mode are adapted to provide the pulse dialling mode, and said microcontroller means are adapted to disable said pulse dialling means and to enable said DTMF generator means after the presence of the ring back signal is detected by said differential amplifier means and after said ring back signal was analyzed and confirmed by said microcontroller means. The handset means is connected to said telephone interface means and said keypad means is connected to said microcontroller means, and in said pulse dialling mode a keypad entries will be transferred into a pulse signals, and in said DTMF dialling mode the keypad entries will be transferred into a DTMF signals.

Also, the present invention includes a telecommunication method enabling a user to get access to an automated call processing system, such as voice mail or the like, which access is strictly limited to a DTMF dialling mode from central office restricted to processing calls in a pulse dialling mode, said method comprising the following steps:

constantly monitoring a telephone line;

analyzing a tone progress signal on said telephone line;

switching in a correct instant between the pulse dialling mode and the DTMF dialling mode to facilitate the access to said automated call processing.

The monitoring of said telephone line is provided to detect a ring signal indicating a receiving call mode, and the monitoring of said telephone line is provided to detect a ring back signal indicating a placing call mode. In said receiving call mode the DTMF dialling mode is activated to allow further DTMF entries, and in placing call mode said pulse dialling mode is firstly activated in the moment when the user started to initiate his call via said central office operating on the pulse dialling mode.

In still another embodiment, said placing call mode the DTMF dialling mode is activated after the detection of the ring back signal was analyzed and confirmed to enable the user to get access to said automated call processing, and in receiving mode the DTMF dialling mode is activated. In said placing call mode the DTMF dialling mode is disactivated until the confirmation of the detection of said ring back signal, wherein said confirmation is indicating that the call has been processed by the central office, and in receiving call mode the ring signal is detected by a telephone interface means.

In yet another embodiment, the monitoring and analyzing of said telephone line is provided by a control means, and the detection of said ring back signal in said placing call mode is provided by differential amplifier means incorporated within said control means. Said control means are providing automatic switching between said pulse dialling mode and said DTMF dialling mode in response on analysis of the tone progress signal of said telephone line, wherein said tone progress signal is the ring back signal processed by said central office.

In another embodiment of the present invention, said DTMF dialling mode is provided by means of a DTMF generator means incorporated within said telephone interface means, and said pulse dialling mode is provided by a pulse dialling means incorporated within said control means. Said telephone interface means are communicating with said control means by means of a set of predetermined commands providing successful operation of all steps of said method, and dialling entries are provided by a keypad means connected to said control means and wherein in said pulse dialling mode said entries will be transferred into the pulse dialling signals and in said DTMF dialling mode said entries will be transferred into the DTMF dialling signals.

DESCRIPTION OF THE PREFERRED EMBODIMENT

The main principle of the present system is based on analyzing the tone progress signals of the telephone line and based on that analysis choosing the correct instant of switching between pulse dialling mode and tone or DTMF dialling mode. While in placing a call mode the ring back signal is analyzed and in receiving call mode the ringing signal is analyzed. The present invention is equipped with special circuitry that constantly monitor the telephone line. When the telephone receives a call the ring signal is detected by its internal circuitry and upon an "off hook" condition the dialling mode is set to tone or DTMF. An "off hook" condition indicates the user of the telephone has answered the call.

Figure 1:
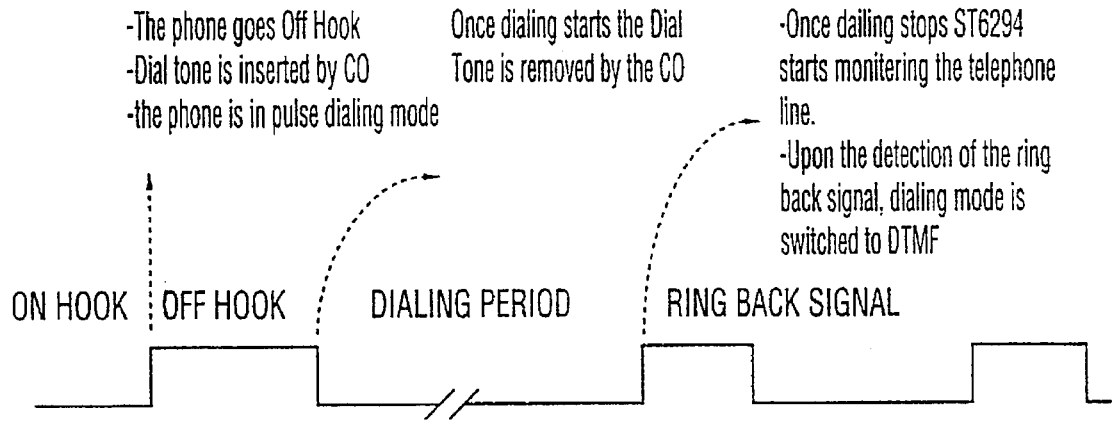
FIG. 1 is graphical diagram showing the sequence of steps in a placing call mode situation.

As it shown on FIG. 1, in a placing call mode there is no ring signal on the telephone line. An "off hook" condition has been detected by the circuitry of the telephone, which is an indication that the user will place a call. In this case the initiating dialling mode will be the pulse dialling since CO can process only pulse dialling. Once dialling has been terminated, the telephone starts to monitor the telephone line waiting for the ring back signal to be present. Upon the detection of the ring back signal the dialling mode is switched into DTMF which permits the user to get access to the application that require so. In this case, the presence of the ring back signal is an indication that the call has been processed by the CO and the telephone is ringing at the called party side.

Figure 2:
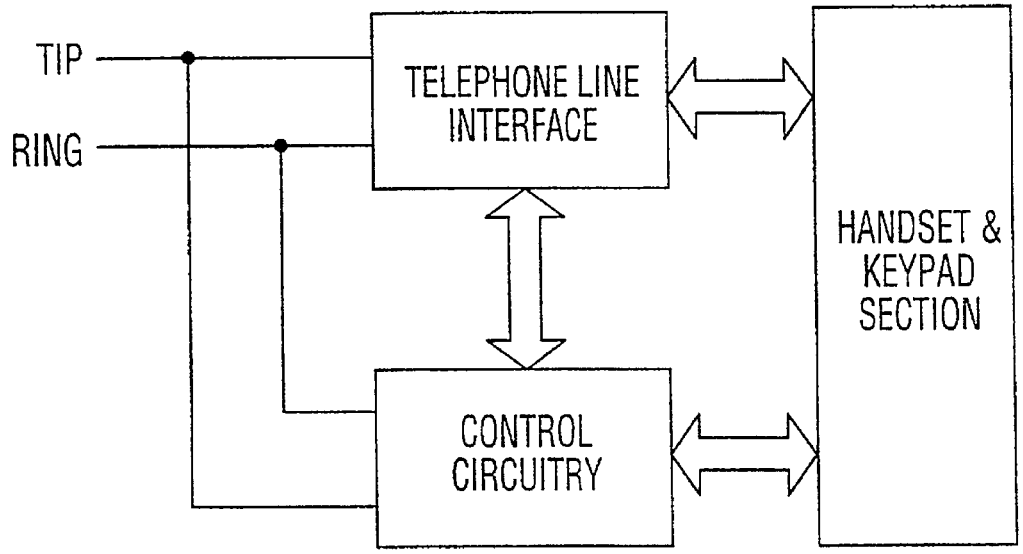
FIG. 2 is a general block-diagram of the present invention.

Referring now to FIG. 2 a block diagram of the present invention is shown. It comprises a telephone line interface means connected to telephone line having Tip and Ring identifications. The system also includes a control means connected to said telephone line and to said telephone interface means. Handset and keypad means are connected to said telephone interface means and said control means respectively. The telephone line interface means further comprises microprocessor means or integrated circuit means and a pulse dialling means or circuit. Preferably, but not necessary said microprocessor comprises TEA 7090 single chip device from SGS-Thomson which integrates the basic functions of a telephone set on one chip, such as:

The speech network
The DTMF or tone generator
The finger
Microcontroller interface The speech network includes a transmitter and receiver channels, to which a handset receiver and handset microphone can be connected.

The DTMF generator is an "on-board" generator. Based on codes received from the microcontroller means the correct DTMF signal will be placed on the telephone line. In this case the microcontroller means supplies the clock of the DTMF generator.

The ringer can generate up to 8 different tones and the volume of the finger can be controlled through the microcontroller means.

Figure 3:
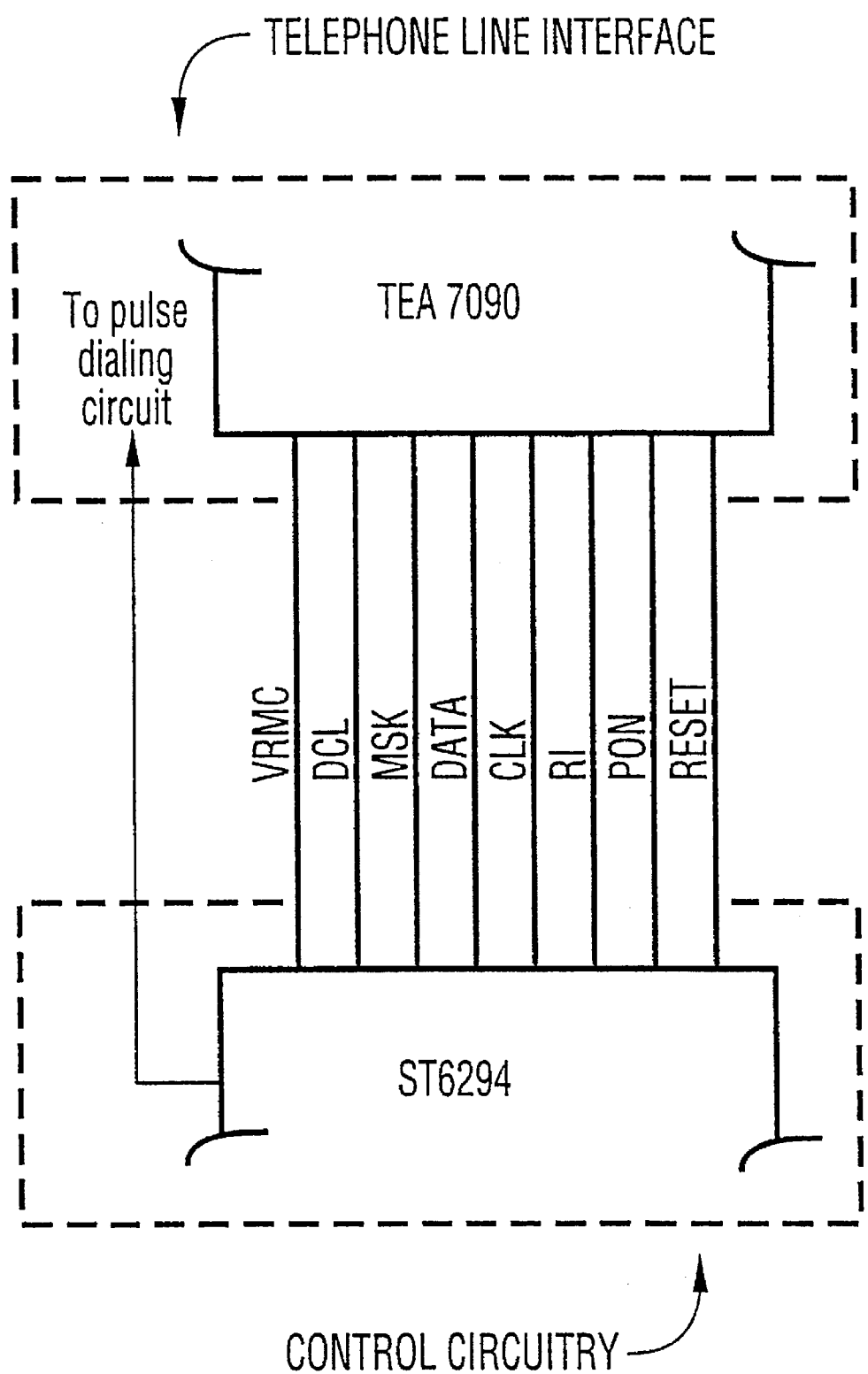
FIG. 3 shows communication lines between a telephone line interface means and a microcontroller means of the present invention.

The microcontroller interface of said microprocessor includes the following output pins (see FIG. 3) by which it communicates with the microcontroller means:

Power supply (VRMC)—this output comprises the 3.5 V regulated voltage supply for the microcontroller means.

Ring Indicator Output (RI)—this signal indicates the presence of a ring signal on the telephone line. The control circuitry or the microcontroller constantly monitors this output pin of the microprocessor.

Power On (PON)—as soon as power supply (VRMC) exceeds 3.15 V, this pin becomes active and indicates that the line current is present. Combined with the reset signal the control circuitry will validate the "off hook" condition.

Reset—this output becomes high on the first positive edge of PON (power on) and stays high as long as power supply (VRMC) is greater than 3.15 V.

Mask (MSK)—is an input pin which should be low during pulse dialling mode.

DTMF Clock (CLK)—this is the clock for the DTMF generator which is supplied by the microcontroller.

Serial Byte Interface (DATA and DCL)—are input pins which carry the necessary codes to control the microprocessor, those codes are:

The DTMF and ring frequency codes;
The mode codes (dialling, speech, mute, ring);
The configuration codes (mask/no mask, receive gain, ring levels, reset codes).

Figure 4:
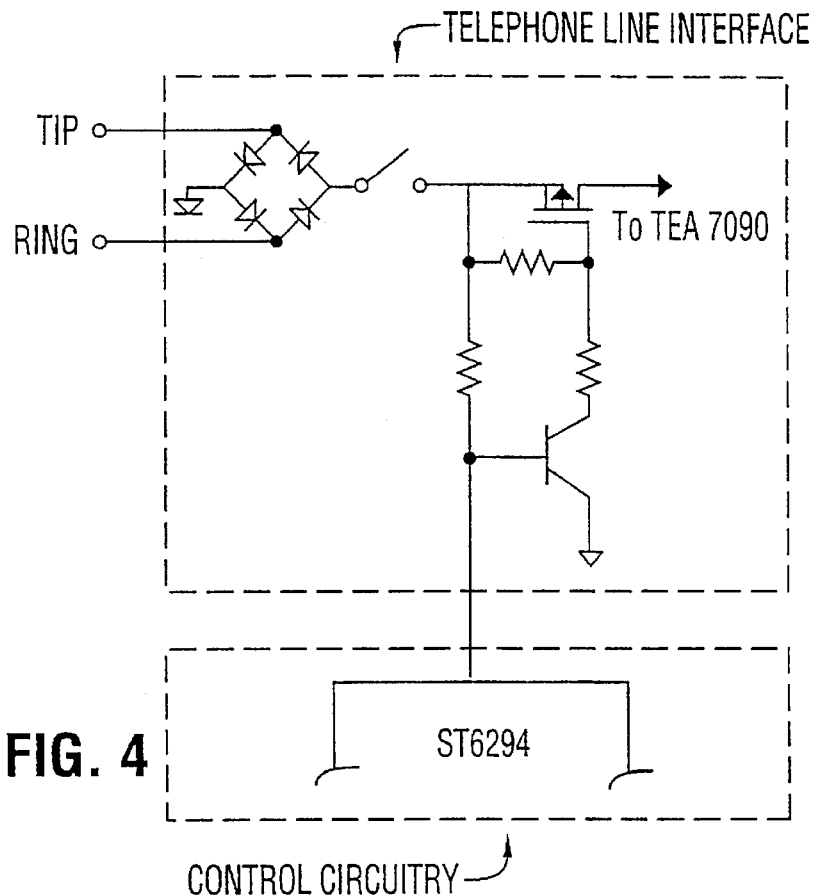
FIG. 4 is a pulse dialling means of the present invention.

Those codes are provided by the microcontroller means of said control means. Referring now to FIG. 4 a pulse dialling means or circuit is shown. It comprises a two-transistor network, which is used to interrupt the loop current and to perform a pulse dialling mode. The transistor network is controlled by one of the output pins of the microprocessor means which sends the correct number of the make/break pulses based on the pressed keypad key.

The control means of the present invention performs the following functions;

Interfacing with the keypad means and decoding the pressed keys or entries;

Performing the pulse dialling;

Constantly monitoring the telephone line and the RI, PON and RESET pins of the microprocessor means and switching from pulse dialling when there is a ring back signal or ring signal on the telephone line;

Interfacing with the microprocessor and performing control functions (DATA and DCL).

Figure 6:
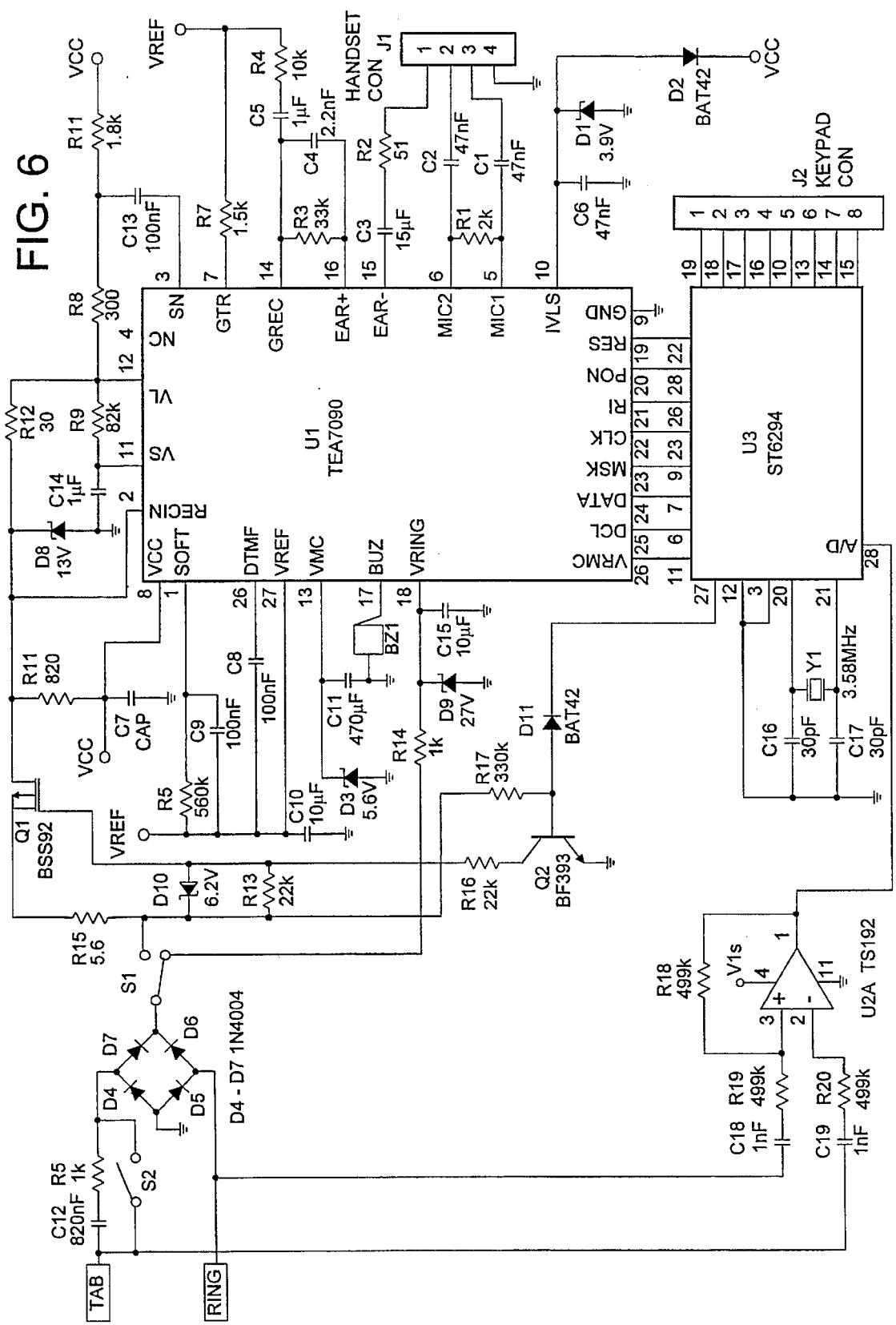
FIG. 6 is a circuit of the preferred embodiment of the present invention.

The control means or circuitry is composed of a micro controller means and a differential amplifier means. As it shown on FIG. 6 the inputs of differential amplifier is connected to the Tip and Ring of the telephone line and its output is connected to the A/D (Analog to Digital) converter of the microcontroller. This output pin is constantly monitored and analyzed for the ring back signal, which is very important feature of the present invention.

Preferably, but not necessary the control means or the microcontroller means comprises the ST6294 from SGS-Thomson and most of the above mentioned operations are performed within the microcontroller by means of predetermined set of commands.

Figure 5:
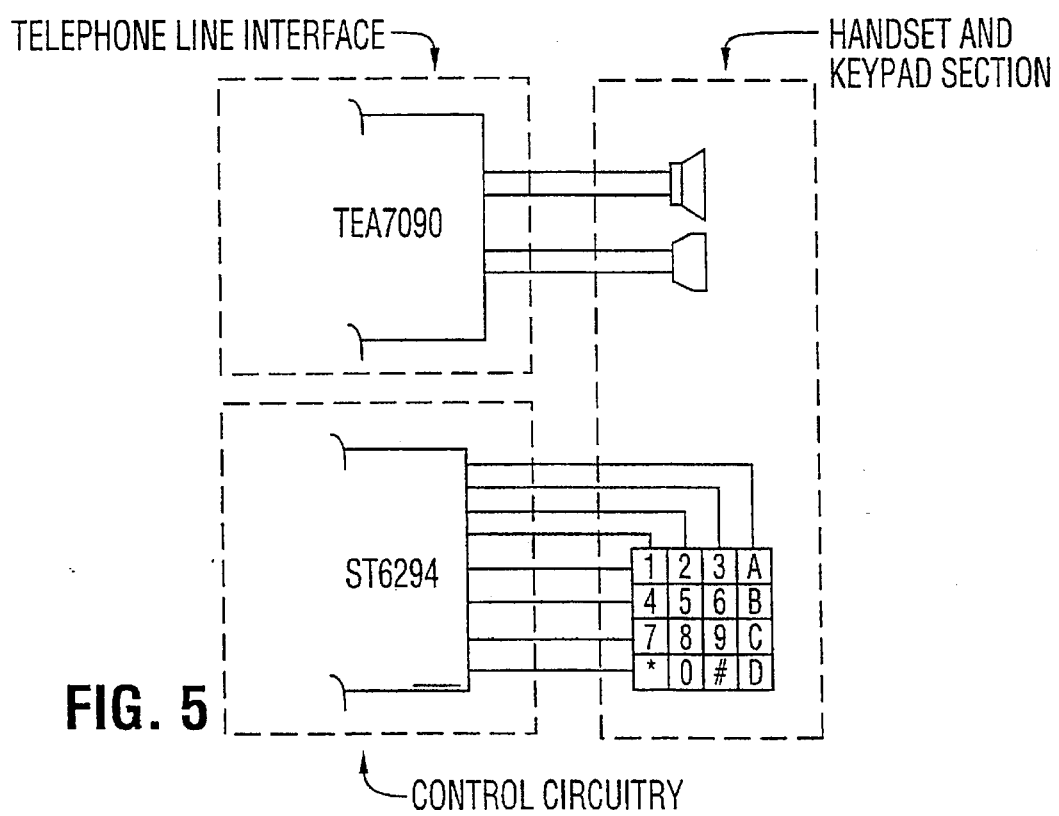
FIG. 5 shows a handset and keypad means of the present invention.

As shown on FIG. 5, a handset means is connected to the receiving and transmitting channel of the speech network of the microprocessor means.

A keypad means is connected to I/O (input/output) pins of the microcontroller means. The microcontroller scans the keypad entries, which the user uses to enter numbers. In pulse dialling mode keypad entries will be transferred into dial pulse, and in DTMF dialling mode keypad entries will be transferred into DTMF signals.

Keypad is also used to perform last number redial and memory dialling.

The present invention operates in two modes which will be discussed below:

Receiving Call Mode

The microcontroller means constantly monitors RI, PON and RESET signals of the microprocessor. When the phone is ringing RI signal will be active indicating the presence of a ring signal on the telephone line. When the user answers the phone (Off hook condition), the PON and RESET signals of said microprocessor become active indicating an "off hook" condition to the micro controller. Those active RI signals followed by active PON and RESET signals is a valid condition to changing the dialling mode to DTMF. In this case the pulse dialling circuit is disabled and the DTMF generator of said microprocessor means is enabled. All keypad entries scanned by the microcontroller are decoded and sent to the microprocessor by means of the DATA and DCL signals, so that the microprocessor places the corresponding DTMF signals on the telephone line. During DTMF or tone dialling mode, keypad entries will generate DTMF tones. For example, if the user presses "1", the telephone will place the equivalent DTMF signal on the telephone line which is the combination of two frequencies 697 Hz and 1209 Hz.

Placing Call Mode

When the user lifts the handset of the phone to place a call, the PON and RESET signals of the microprocessor means become active indicating an "off hook" condition. The microcontroller constantly monitor the RI, PON and the RESET pins of the microprocessor. An active PON and RESET signals without the presence of an active RI signal is an indication that the user will place a call. In this case the telephone has to be in pulse dialling mode, therefore the microcontroller disables the DTMF generator of said microprocessor and activates the pulse dialling means or circuit.

Figure 7:
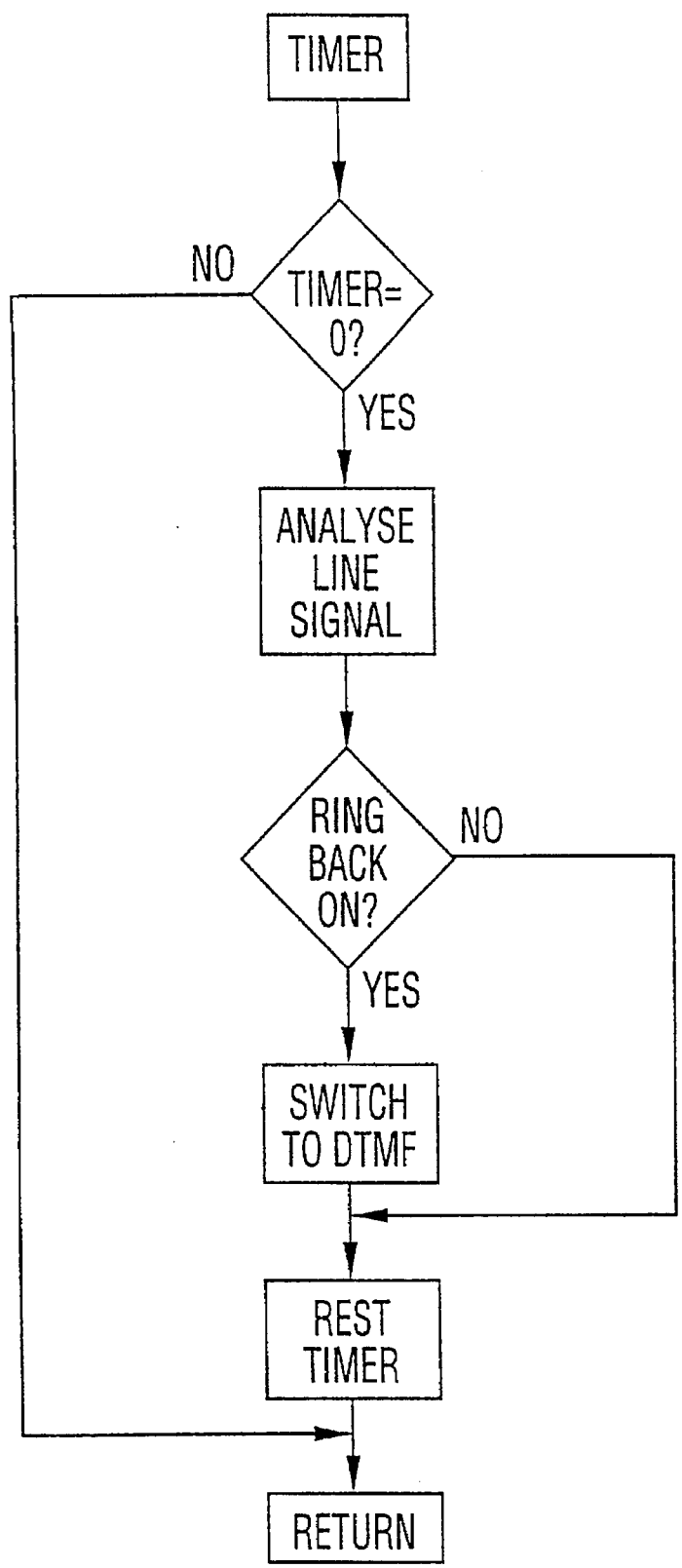
FIG. 7 and FIG. 8 show flow-chart of the present invention.
Figure 8:
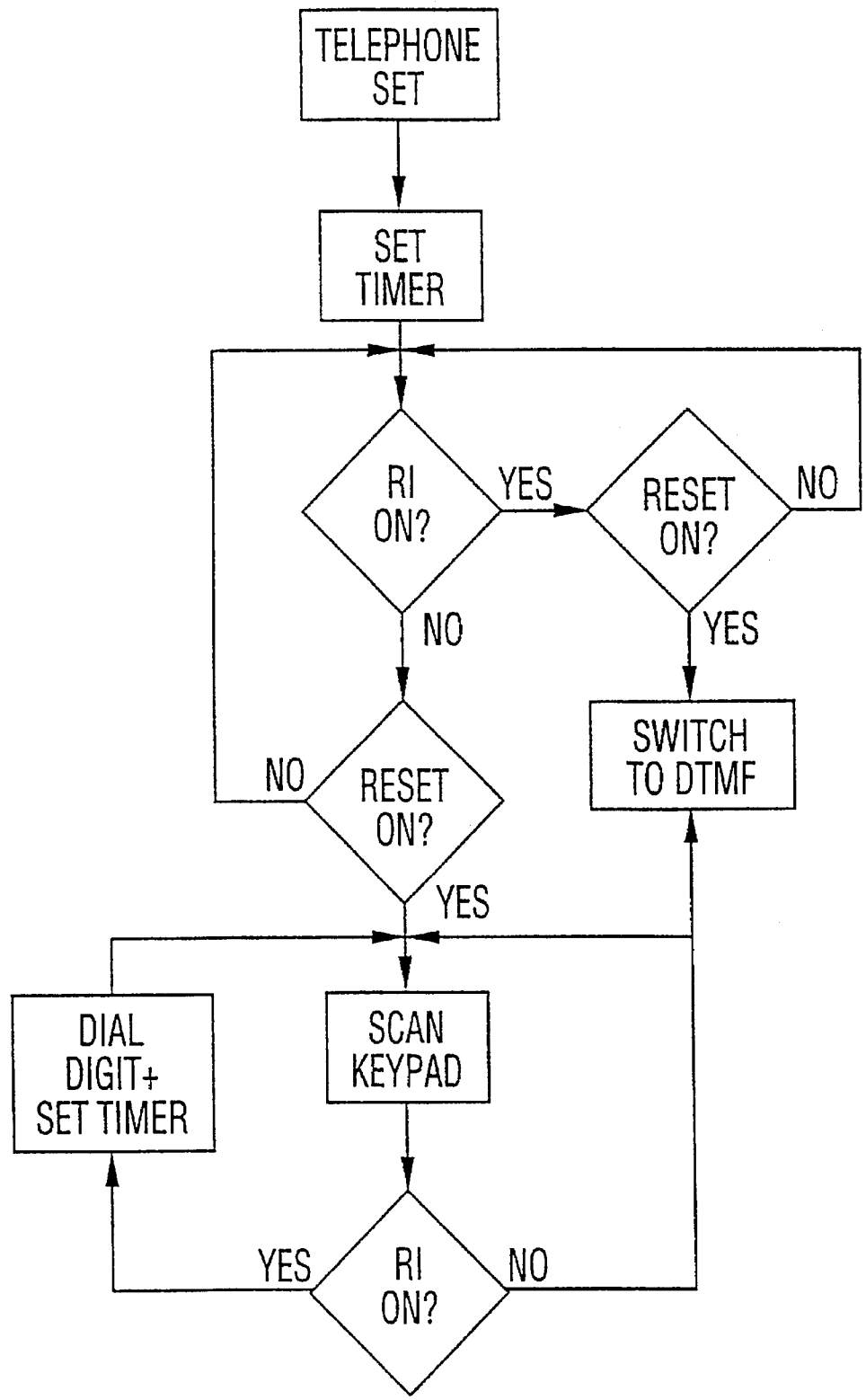

In the pulse dialling mode the telephone will generate dial pulses for each pressed keybutton. The pulse dialling is achieved through one of the output pins of the microcontroller which drives the line break transistor in the pulse dialling circuit of FIG. 4. The number of pulses depends on the sequence of the depressed keys. When the user has finished dialling the number, the microcontroller starts monitoring and analyzing the output of the differential amplifier means of FIG. 6. The output signal of said amplifier means is an analog signal, and before performing any analysis, the microcontroller will first convert this signal into a digital format by means of using A/D converter incorporated on said microcontroller. After A/D conversion, filtering and zero crossing analysis are performed on said signal and as result of this analysis the presence of ring back signal is finally confirmed. Upon the detection and confirmation of the ring back signal the microcontroller stops monitoring the output of the differential amplifier means, disables or switches automatically without human intervention the pulse dialling circuit and enables the DTMF generator of said microprocessor. This operation will change the dialling mode of the telephone from pulse into DTMF. During DTMF or tone dialling, keypad entries will generate DTMF tones. For example, if the user presses "1", the telephone will place equivalent DTMF signal on the telephone line which is the combination of two frequencies 697 Hz and 1209 Hz. The telephone will stay in tone or DTMF dialling mode as long as the user stays in "off hook" condition. Once the phone goes "on hook", the microcontroller will immediately reset the whole processes of detection, and analysis will start from the beginning. FIGS. 7 and 8 illustrate the flow-chart of the commands operating steps of the method according to the present invention the details of which are explained below:

| FLOW CHART DETAILS | |
| --- | --- |
| Bloc TELEPHONE SET | Power On, the program starts here |
| Bloc SET TIMER | A Counter is initialized. This will determine the keypad scanning interval. |
| Question RI On? | Is the Ring Indicator On? Is the telephone ringing? If yes, it means we are receiving a call. |
| Question RESET On? | Is the Reset Indicator On? Is the telephone handset up? If we were receiving a call, it means the call was answered. |
| Bloc SWITCH TO DTMF | Change the Dialling Mode from Pulse to Tone (Touch Tone). |
| Bloc SCAN KEYPAD | Scan the keypad to check if any number was pressed. |
| Question DIGIT? | Was a digit pressed? |
| Bloc DIAL DIGIT + SET TIMER | Dial the digit pressed by user and reinitialise the timer. |
| Bloc TIMER | When we are placing a call, this bloc is started any time we complete one period of timer, what ever is the state of the system. |
| Question TIMER = 0? | Is the Timer Counter = 0? Is the period of time expired? |
| Bloc ANALYZE LINE SIGNAL | Take a sample of the line signal and analyze it. |
| Question RING BACK On? | Is the ring back signal on the line? |
| Bloc RESET TIMER | Reinitialise timer counter. |

| FLOW CHART DETAILS | |
|---|---|
| Bloc RETURN | Since this part of the program (TIMER) is started at the end of a timer period no matter what is the state of the system, this bloc goes back to the point where the system was at the end of the period. |

Thus the present invention allows the user to get access to any automated call processing system including, but not limiting, to automated attendant, voice mail, telebanking, voice response, digital paging etc., access to which are strictly limited to callers equipped with a DTMF telephone and central office services based on DTMF.

The telephone according to the present invention can also be combined with many other features, such as speakerphone, speed dialling or last number redial or the like, without any interferance with the proper functionality of the telephone.

It will be obvious to those skilled in the art that numerous modifications of the present invention may be made without departing from the spirit of the present invention which shall be limited only by the scope of the claims appended hereto.

What is claimed is:

1. Telecommunication system enabling a user to get access to any automated call processing systems, said system comprising in combination:
   a telephone line interface means adapted to provide function of a telephone set;
   a control means connected to said telephone line interface means and adapted to constantly monitor the telephone line, analyze call progress and a ring back tone signals, and to switch automatically without human intervention from a pulse dialling mode to a DTMF dialling mode upon detection of a validated central office ring back signal; and
   a handset and keypad means connected to said telephone interface means and said control means;
   wherein said central office processes calls in a pulse dialling mode and wherein said system enables the user to get access to said automated call processing systems, the access to which is limited only to callers equipped with a DTMF telephone and a central office service of DTMF.

2. Telecommunication system according to claim 1, wherein said telephone interface means are adapted to detect a ring signal on said telephone line, wherein said ring signal is indicating a receiving call mode.

3. Telecommunication system according to claim 1, wherein said control means are adapted to detect a ring back signal, wherein said ring back signal is indicating a placing call mode.

4. Telecommunication system according to claim I, wherein said control means comprises:
   a microcontroller means and
   a differential amplifier means.

5. Telecommunication system according to claim 1, wherein said telephone line interface means comprises:
   a microprocessor means and
   a pulse dialling means.

6. Telecommunication system according to claim 5, wherein said microprocessor means further comprises a DTMF generator means adapted to provide the DTMF dialling mode.

7. Telecommunication system according to claim 4, wherein said differential amplifier means is connected to the telephone line and is adapted to detect the ring back signal.

8. Telecommunication system according to claim 4, wherein said microcontroller means is adapted to monitor and analyze presence of the ring signal detected by said telephone interface means.

9. Telecommunication system according to claim 7, wherein said microcontroller means are adapted to monitor and analyze an output of said differential amplifier means.

10. Telecommunication system according to claim 7, wherein said microcontroller means are adapted to operate in the pulse dialling mode as the default mode upon placing a call.

11. Telecommunication system according to claim 7, wherein said microcontroller means are adapted to disable said pulse dialling means and to enable said DTMF generator means after the ring back signal is detected by said differential amplifier means and after said ring back signal was analyzed and confirmed by said microcontroller means.

12. Telecommunication system according to claim 4, wherein the handset means is connected to said telephone interface means and said keypad means is connected to said microcontroller means.

13. Telecommunication system according to claim 12, wherein in said pulse dialling mode a keypad entries will be transferred into a pulse signals, and in said DTMF dialling mode the keypad entries will be transferred into a DTMF signals.

14. Telecommunication method enabling a user to get access to an automated call processing system, such as voice mail or the like, the access to which is strictly limited to a DTMF dialling mode, from central office restricted to processing calls in a pulse dialling mode, said method comprising the following steps:
   constantly monitoring a telephone line;
   analyzing a tone progress signal on said telephone line;
   switching in a correct instant between the pulse dialling mode and the DTMF dialling mode to facilitate the access to said automated call processing.

15. Telecommunication method according to claim 14, wherein the monitoring of said telephone line is provided to detect a ring signal indicating a receiving call mode.

16. Telecommunication method according to claim 14, wherein the monitoring of said telephone line is provided to detect a ring back signal indicating a placing call mode.

17. Telecommunication method according to claim 15, wherein in said receiving call mode the DTMF dialling mode is activated to allow further DTMF entries.

18. Telecommunication method according to claim 16, wherein in said placing call mode said pulse dialling mode is firstly activated in the moment when the user started to initiate his call via said central office operating on the pulse dialling mode.

19. Telecommunication method according to claim 18, wherein in said placing call mode the DTMF dialling mode is further activated after the detection of the ring back signal was analyzed and confirmed to enable the user to get access to said automated call processing.

20. Telecommunication method according to claim 18, wherein in said placing call mode the DTMF dialling mode is disactivated until the confirmation of the detection of said ring back signal, wherein said confirmation is indicating that the call has been processed by the central office.

21. Telecommunication method according to claim 15 wherein in said receiving call mode the ring signal is detected by a telephone interface means.

22. Telecommunication method according to claim 14, wherein the monitoring and analyzing of said telephone line is provided by a control means.

23. Telecommunication method according to claim 21, wherein the detection of said ring back signal in said placing call mode is provided by differential amplifier means incorporated within said control means.

24. Telecommunication method according to claim 22, wherein said control means are providing automatic switching between said pulse dialling mode and said DTMF dialling mode in response upon analysis of the tone progress signal of said telephone line, wherein said tone progress signal is the ring back signal processed by said central office.

25. Telecommunication method according to claim 21, wherein said DTMF dialling mode is provided by means of a DTMF generator means incorporated within said telephone interface means.

26. Telecommunication method according to claim 22, wherein said pulse dialling mode is provided by a pulse dialling means incorporated within said control means.

27. Telecommunication method according to claim 24, wherein said telephone interface means are communicating with said control means by means of a set of predetermined commands providing successful operation of all steps of said method.

28. Telecommunication method according to claim 22, wherein dialling entries are provided by a keypad means connected to said control means and wherein in said pulse dialling mode said entries will be transferred into the pulse dialling signals and in said DTMF dialling mode said entries will be transferred into the DTMF dialling signals.

* * * * *